Nov. 19, 1968 J. C. SIMS, JR 3,412,383

AIR BEARING MAGNETIC HEAD MOUNTING APPARATUS

Filed July 19, 1965 2 Sheets-Sheet 1

INVENTOR.
JOHN C. SIMS JR.
BY
Kenway, Jenney & Hildreth
ATTORNEYS

Nov. 19, 1968 J. C. SIMS, JR 3,412,383

AIR BEARING MAGNETIC HEAD MOUNTING APPARATUS

Filed July 19, 1965 2 Sheets-Sheet 2

INVENTOR.
JOHN C. SIMS JR.
BY
Kenway, Jenney & Hildreth
ATTORNEYS

United States Patent Office 3,412,383

Patented Nov. 19, 1968

3,412,383

AIR BEARING MAGNETIC HEAD MOUNTING APPARATUS

John C. Sims, Jr., Sudbury, Mass., assignor, by mesne assignments, to Mohawk Data Sciences Corporation, East Herkimer, N.Y., a corporation of New York Filed July 19, 1965, Ser. No. 473,065
5 Claims. (Cl. 340—174.1)

ABSTRACT OF THE DISCLOSURE

A magnetic read-write head is mounted in operational relationship to a rotating memory disk by a three legged spider spring having an equal spring constant for all degrees of pivotal head flexure. In addition the head is suspended from a spring biased rocker arm which coacts with actuating mechanism to permit selective retraction of the head from its operative position. The three-point spider is provided with adjustment means for changing the angle at which the head meets the disk surface.

This invention relates to an improved mounting apparatus for the pick-up heads of magnetic disk information storage files. In files of this type, a plurality of disks are conventionally mounted in spaced-apart relation on a common axle, and magnetic tracks are recorded on either of the plane circular surfaces of each disk, in a number of concentric tracks. Information is recorded on or extracted from these tracks by means of magnetic pick-up heads, one such head being provided for each recording surface. A series of heads may be mounted on arms affixed to a common support: access to any of the selected concentric recording tracks is obtained by moving this support to align all of the heads radially with corresponding tracks on each disk.

The heads must be spaced very close to the recording surface to record or reproduce properly; for example, a spacing of about 100 micro inches may be required. This spacing must be maintained nearly uniform in spite of unavoidable irregularities in the surface planes of the recording disks. In spite of great care in the manufacture of the disks, there will be some degree of run-out from true planarity. Further, the disks are rotated at a high rate of speed reaching local linear velocities which may typically vary from one to two thousand inches per second over the radius of the effective recording surface. Irregularities in the surface therefore produce considerable dynamic perturbation of the pick-up heads, which makes it very difficult to maintain proper spacing and alignment with the recording track. Collison of the heads with the disks is a disastrous occurrence which has been common.

It is the primary object of the present invention to provide an improved mounting apparatus for the pick-up heads of a magnetic disk information storage file, which maintains proper alignment and spacing against disturbances. Another object is to improve the uniformity of the relationship between a pick-up head, and the recording surface of a magnetic information storage disk which supports the head by means of hydrodynamic bearing action. Further objects and advantages of the invention will appear as the following description proceeds.

I may carry out my invention in a disk file having a mounting apparatus as described and claimed in an application filed concurrently herewith by John Handley, entitled "Mounting Apparatus for Pick-Up Heads of Magnetic Disk Information Storage Files." A disk file of the type described in that application has one or more disks mounted in spaced-apart relation for rotation about a common axis normal to their parallel recording surfaces. Mounting arms support rockers for pivotal movement each about an axis parallel to a recording surface, and each rocker carries a pick-up head. The rocker is spring-loaded in a direction to bias the pick-up head toward the disk surface. The rocker supports the head with a slight angle of inclination away from the oncoming surface of the disk; that is, inclined in a plane tangent to a recording track, so that there is a greater clearance from a point on the recording track just approaching the head than there is from a similar point departing from the head. Hydrodynamic lift is developed by the boundary layer air carried by the disk surface, to lift the head against the bias of the rocker-biasing spring, thus tending to hold the head in a stable position relative to the disk surface and at a very slight spacing therefrom.

According to the present invention, I mount each pick-up head on a rocker of the previously-described structure, by means of a spider spring, which supports the head with elastic neutrality. I have found that this means of support, in combination with the spring-biased rocker, affords unique stability to the delicate dynamic balance of the head between the opposed forces of the combined spring bias and the hydrodynamic bearing action of the rapidly-revolving disk. The spider spring has a relatively greater spring constant than the rocker-biasing spring. Perturbations of the head are accommodated principally by slight pivotal movements of the rocker, rather than by angular deflections of the head relative to the disk surface. This arrangement prevents substantial changes in the inclination of the head, which could otherwise cause a breakdown of the hydrodynamic bearing, and catastrophic direct contact between the head and recording surface.

I further mount the spider spring affixed to each head in adjustable angular relation to the associated rocker, by securing the free ends of the legs of the spider spring in a toe plate, which is in turn adjustably mounted on the rocker. In the preferred form, adjustable fasteners secure the toe plate, and compressible members are interposed between the toe plate and rocker for secure adjustment. This permits the angle of inclination of the head to be adjusted precisely relative to the recording surface, to obtain the correct hydrodynamic bearing action.

While the specification concludes with claims particularly pointing out the subject matter which I regard as my invention, it is believed that a clearer understanding may be gained from the following detailed description of a preferred embodiment thereof, referring to the accompanying drawings, in which;

Figures 2, 3:
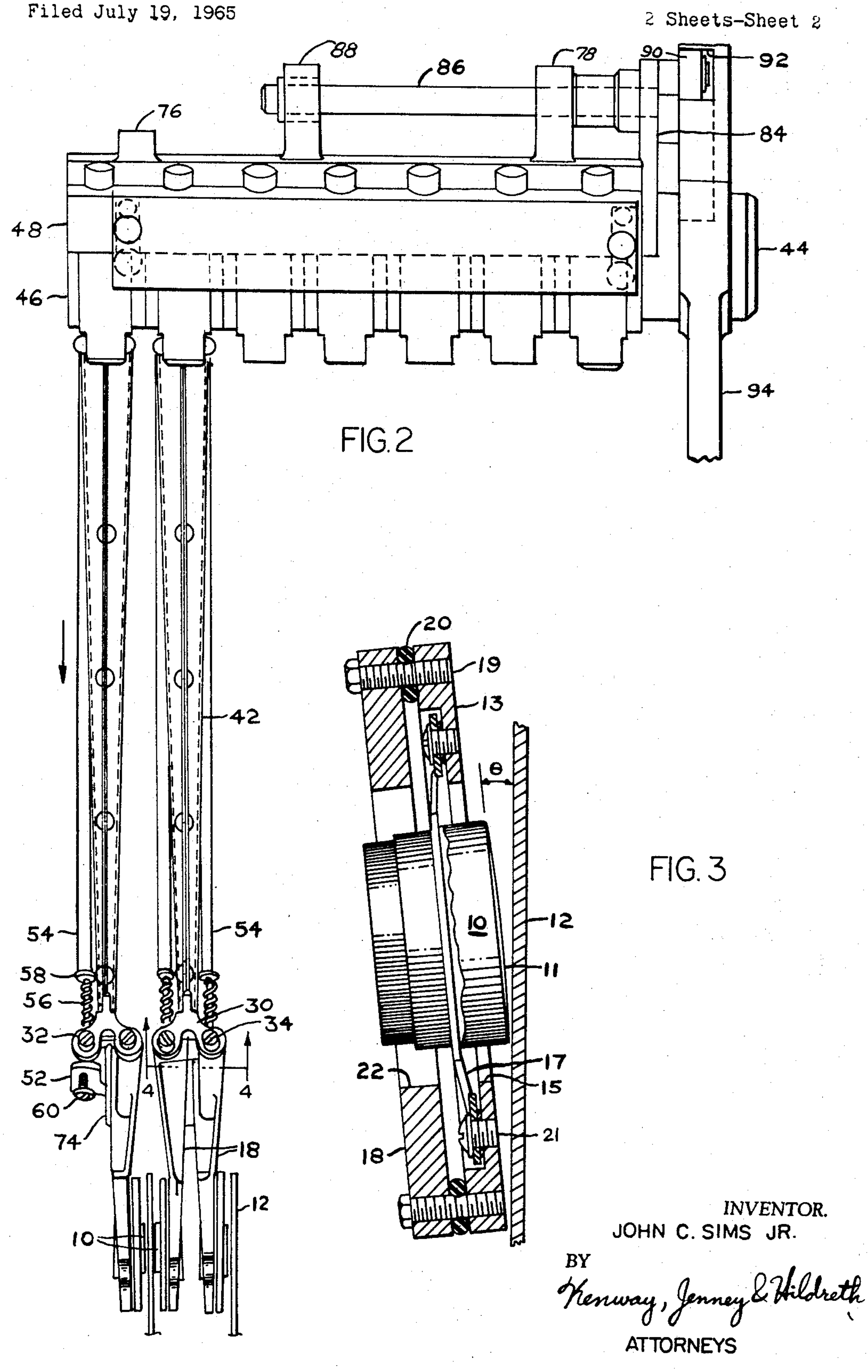
FIG. 2 is a fragmentary plan view.
FIG. 3 is a fragmentary sectional view in front elevation and on an enlarged scale, showing the inclined relationship between one of the pick-up heads and a recording disk.

In the preferred embodiment shown, a series of magnetic pick-up heads 10 is movably supported by the apparatus for reproducing or recording information on a series of parallel coaxial recording disks 12. Each head cooperates with one circular plane surface of one of the series of disks, as shown in FIG. 2. The pick-up heads are of a conventional type, serving to produce electrical signals in response to magnetic patterns recorded on the disk surfaces, or alternatively to record magnetic patterns in accordance with input signals. Conventional electrical connections for each head are made through leads 14 and 16, having a connector 15 for convenience in replacing the head as necessary.

Satisfactory recording and reproduction can be secured only if the heads are maintained in appropriate closely spaced relation to the surfaces of the disks, and in proper radial alignment with the recorded tracks on the disk surfaces. The recording tracks are typically about 10 mils in width, and highly accurate radial alignment of the head is necessary to secure a maximum inductive coupling for securing adequate signal strength. The head must be held in close proximity to the recording surface, typically at about a 100 micro inch spacing, for the same reason.

At the same time, the disks are rotated at a high rate of speed to increase the rapidity of recording and reproducing of information; the local linear velocity of the recording surface relative to the head may typically reach one to two thousand inches per second. At such high velocities, the boundary layer of air travelling with the disk surface produces substantial hydrodynamic forces on the pick-up head, and if there is any run-out or deviation of the recording surface from a true plane, the resulting perturbation of the head can result in substantial variations in signal strength. Further, catastrophic physical contact between the head and recording surface at such relative velocities has been a common problem.

Provided that the head is pressed toward the disk surface with a yielding pressure, and supported at an angle $\theta$ (FIG. 3) inclined away from the direction of the linear velocity vector of the oncoming disk surface, a hydrodynamic bearing action is established which balances the head against the bias of the supporting springs, at appropriate spacing from the disk. The value of the angle $\theta$ is not precisely established, but is readily determined by experiment in actual practice. The head has a slight crown 11 on the surface confronting the disk, which appears to improve the hydrodynamic effect.

Each pick-up head is mounted with elastic neutrality by means of a spider spring 17, within an opening 15 in a toe-plate 13. The spring 17 has a plurality of spiral arcuately-extending arms which terminate at equally circumferentially-spaced points, and are secured to the toe-plate by means of screws 21. The toe-plate is secured to the rocker 18 by screws 19; by inserting a resilient O-ring 20 between each of a series of peripheral mounting points of the toe-plate and the rocker, the angle of inclination $\theta$ of the head can be adjusted by means of the screws 19. The head fits within an opening 22 in the rocker.

Each rocker 18 is pivotally mounted in a rocker support fork 30 by means of pivots 32, 34, threaded in the arms of the fork, and engaging arms 26, 28, respectively, which are formed in the rocker. The pivots 32, 34 are secured in an adjusted position by set screws (not shown) threaded into bosses 38 in the fork, and the pivot threads 32, 34 are protected by compliant inserts under the set screws. A spring 36 biases rocker 18 against the registration pivot 34 to provide a constant position with a minimum of friction.

The pivotal axis defined by the pivots 32, 34 is substantially parallel to the recording surface of the disk, but is inclined to a radius of the recording surface extending to the head. By adjusting the rocker along the pivotal axis relative to the fork 30, a component of radial adjustment of the head relative to the disk plane is introduced. In this manner, each head can be aligned precisely with a recording track while its support fork 30 is held in a stationary position. Alignment with any given track suffices to align the heads with all other tracks, provided that the tracks are accurately spaced and the heads are accurately shifted when repositioning occurs.

Referring to FIG. 2, it will be seen that a rocker and head assembly is provided for each surface of the disk 12, and that the rocker support forks 30 are bifurcated so that each accommodates a pair of rockers, with the exception of the endmost forks. Each fork 30 is riveted at 43 to the end of a supporting arm 42, which is preferably formed of two shells riveted together for a maximum of rigidity with a minimum of mass. The various arms are affixed to a shaft 44 by means of a clamp comprising a half collar 46 for each arm 42 and a common half collar 48 to which the half collars 46 are secured by machine screws 50. Rotation of the shaft moves the arms about its axis for positioning the various heads in alignment with any desired tracks on the recording disks. Conventional mechanism (not shown) is provided for positioning the shaft 44.

Figures 1, 4:
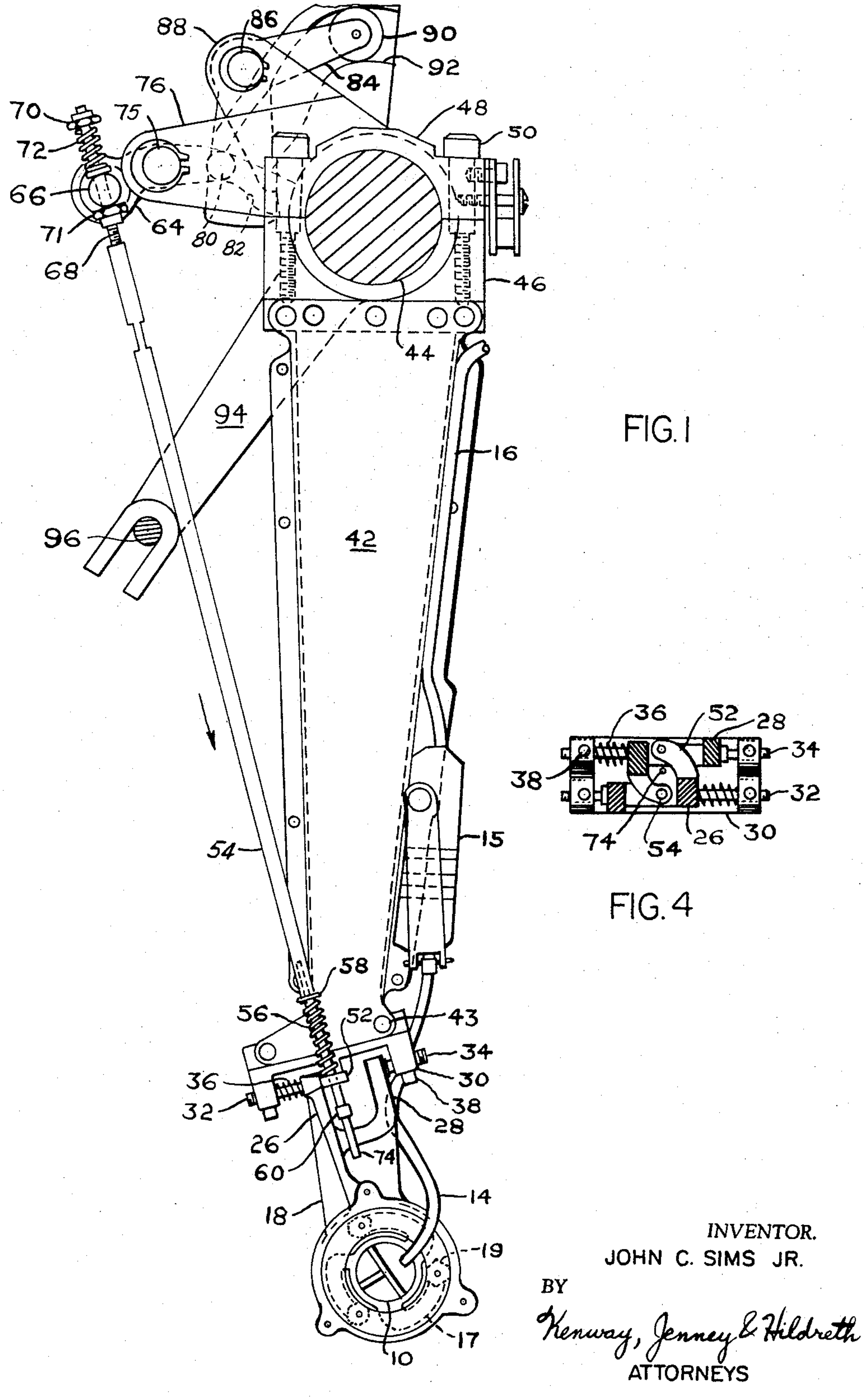
FIG. 1 is a view in side elevation of a preferred form of the head mounting apparatus.
FIG. 4 is a sectional view taken along line 4—4 in FIG. 2.

The heads and rockers are pivotally movable about the axis defined by the pivots 32, 34 so that the heads can alternatively be moved into pick-up relation to the disk surfaces, or retracted to a spaced-apart relation. The action of bringing the heads into pick-up relation to the disk surfaces will be referred to hereinafter as "landing." For this purpose, each rocker 18 is provided with a transversely extending ear 52, for pivotal movement by a push rod 54 and a compression spring 56. Motion of the push rod in the direction shown by the arrows in FIGS. 1 or 2 is transmitted through a shoulder 58 and the spring 56 to the corresponding ear 52. The spring 56 is received about an elongated adjustment screw 60, which passes freely through the ear 52 and is threaded into the end of the push rod; the head of the screw serves to limit return movement of the push rod.

Each rocker 18 is actuated by a push rod 54 located at that side of its supporting arm 42 that is opposite with respect to the corresponding heads; adjacent rockers are arranged as shown in FIG. 4 for this purpose.

Actuation of the push rods 54 to land the heads is brought about by a linkage which includes a rocker lever 64, receiving a bail 66, which extends the width of the apparatus to slidably receive a stud 68 at the end of each push rod. Nuts 70 and 71 are threaded on each stud, adjustably compressing a return spring 72 to bias the associated push rod and connected rocker in a direction to retract the corresponding pick-up head from the disk surface. The rockers are arrested in their retracted positions by abutment against stop pins 74 (FIG. 4), fixed in each rocker support fork 30. One such stop pin accommodates a pair of adjacent rockers mounted on a common fork.

The rocker lever 64 is pivotally mounted by means of a shaft 75, which is in turn pivotally supported in a pair of standards 76, 78, extending from the clamp block 48. A roller 80 is carried by the lever 64, and is received in a cam track 82 formed in one arm of an intermediate cam lever 84. The lever 84 is pivotally mounted on a shaft 86, which is in turn pivotally supported in standards 78 and 88. The lever 84 bears a roller 90, which rides in a cam groove 92 formed in a landing cam lever 94. The lever 94 is loosely mounted on the shaft 44 and it may be operated by a pin 96.

Conventional motive means (not shown) are provided for driving the pin 96 to land or retract the heads. It is important, however, that this motive device provide a mechanical spring return system which will activate and safely retract the heads from the landed position in the event of power failure. This mechanism is carried with the arm assembly as it is rotationally positioned by the shaft 44, so that the heads may be shifted from track to track without changing their landed or retracted relation to the disks.

In the position of the landing linkage shown in FIG. 1, the cam lever and push rods are positioned to land the heads in pick-up relation to the disks. The cam tracks 92 and 82 are formed as circular segments of different radii about the axes of the shafts 44 and 86, respectively, interconnected by transition sections. Thus there is no torque effort on the linkage when the heads are in either their landed or retracted positions. To retract the heads the lever 94 is rotated clockwise, thus pivoting the levers 84 and 64 clockwise, and drawing the push rods upwardly as viewed in FIGS. 1 and 2.

While I have illustrated and described a preferred embodiment of my improved mounting apparatus by way of illustration, it will be apparent to those skilled in the art that various changes and modifications may be made without departing from the true spirit and scope of the invention, which I therefore intend to define in the appended claims without limitation to the details of the foregoing embodiment.

What I claim is:

1. Mounting apparatus for supporting a magnetic transducer for air bearing operation with a moving magnetic recording surface, comprising, in combination:

a rockable mounting arm;

spring means connecting said transducer to said arm;

means for selectively rocking said arm toward and away from said recording surface to enable selective application of said transducer to said surface; and selectively operable means for varying the angle at which said transducer approaches said surface during said application operation.

2. The mounting apparatus of claim 1 wherein said spring means is substantially non-yieldable in response to forces tending to urge said transducer bodily away from said recording surface during operation of said transducer therewith, said apparatus further comprising:

additional spring means biasing said arm toward said surface during operation of said transducer therewith, whereby said transducer is maintained in a stable operating position with respect to said surface.

3. The mounting apparatus of claim 1 wherein said spring means comprises a three-point spider spring.

4. The mounting apparatus of claim 3 wherein said spider spring is connected to said arm by a plurality of compressible members and fasteners adjustably compressing the various compressible members for supporting said transducer at a desired angle of inclination to said recording surface as said transducer approaches the latter during said application operation.

5. The mounting apparatus of claim 3 wherein said spider spring has three arcuate legs terminating at free ends thereof in uniformly circumferentially-spaced mounting portions;

together with a toe-plate secured to said mounting portions, a plurality of compressible members interposed between said toe-plate and said arm, and adjustable fasteners attaching said toe-plate to said arm and adjustably compressing the various compressible members for supporting said transducers at a desired angle of inclination to said recording surface as said transducer approaches the latter during said application operation.

References Cited

UNITED STATES PATENTS

| | | | |
|---|---|---|---|
| 3,213,461 | 10/1965 | Goddard | 340—174.1 |
| 3,124,660 | 3/1964 | Criner | 340—174.1 |
| 2,961,494 | 11/1960 | Darou et al. | 340—174.1 |
| 2,937,240 | 5/1960 | Harker | 340—174.1 |
| 2,862,781 | 12/1958 | Baumeister | 340—174.1 |
| 3,310,791 | 3/1967 | Fischer | 340—174.1 |

BERNARD KONICK, *Primary Examiner.*

A. I. NEUSTADT, *Assistant Examiner.*